United States Patent [19]

Kelly

[11] 4,059,985
[45] Nov. 29, 1977

[54] HEAD GASKET LEAK DETECTOR

[76] Inventor: Buford L. Kelly, 1570 West St., Southington, Conn. 06489

[21] Appl. No.: 692,463

[22] Filed: June 3, 1976

[51] Int. Cl.² .......................................... G01M 3/02
[52] U.S. Cl. ................................. 73/46; 116/114 AG
[58] Field of Search ................ 73/46, 118, 119 R, 47, 73/347, 322; 123/41.15; 116/114 AG

[56] References Cited

U.S. PATENT DOCUMENTS

| 1,517,796 | 12/1924 | Muzzy | 340/60 UX |
| 1,679,451 | 8/1928 | Duzer | 73/322 |
| 2,415,108 | 2/1947 | Newman | 73/40.5 R X |
| 2,940,301 | 6/1960 | Hughes et al. | 73/46 X |
| 3,370,468 | 2/1968 | Healy | 123/41.15 X |

Primary Examiner—Jerry W. Myracle

Attorney, Agent, or Firm—McCormick, Paulding & Huber

[57] ABSTRACT

The radiator filler cap of a conventional internal combustion engine is replaced by an upwardly open tubular device having an adapter at its lower end to fit the radiator filler opening and seal off the radiator vent opening associated therewith. Liquid is added to the device to cause an indicator to float therein, and combustion gases escaping through the faulty head gasket will cause the indicator to vibrate when the engine is rotated. Each engine cylinder is vented in turn, by a tool acting on the valve operating mechanism to permit the observer to note when the vibrating indicator becomes stationary, indicating that the cylinder with the faulty head gasket has been isolated.

11 Claims, 3 Drawing Figures

HEAD GASKET LEAK DETECTOR

SUMMARY OF THE INVENTION

This invention relates generally to leak detectors, and deals more particularly with a leak detector especially useful for isolating the faulty head gasket in a multi-cylinder internal combustion engine of the diesel type.

The general object of the present invention is to provide an improved leak detector system which will permit the mechanic to conveniently isolate the faulty cylinder in any internal combustion engine simply by replacing the conventional filler cap on the radiator of the engine with a device having an indicator which vibrates in response to gases escaping from the compression chamber of the faulty cylinder into the engine's cooling system, and while the engine is operating, individually opening the exhaust valve of each cylinder, in its turn so as to vent each combustion chamber until that chamber causing the gases to escape into the cooling system is isolated.

In carrying out the method of the present invention for isolating one of several cylinders suspected of having a faulty head gasket, the mechanic will first remove the filler cap on the radiator filler opening, and also will remove the engine valve covers. He will then insert a device, constructed in accordance with the present invention, in the radiator filler opening, several adapters being provided for the device to permit fitting thereof to radiators of various size. The engine will then be started to cause gases to be compressed in the various combustion chambers of its various cylinders, and to thereby force the escaping gases to pass through the blown head gasket into the engine cooling system. The gases are ultimately vented through the cooling system and upwardly into the indicator device, causing vibration of an indicator which the mechanic can observe visually. The machanic will then interrupt the compression in the combustion chamber of each cylinder in turn while the engine is operating in order to determine which cylinder has the faulty head gasket by simply observing the indicator to see when it stops vibrating due to the escaping gases.

The indicator device is tubular in shape and has internal structure for supporting the indicator for limited vertical floating movement therein. The lower end of the tubular device is adapted to carry one of several adapters or fittings, in order to allow use of the indicator device on radiator openings of various size. A tool is provided for aiding the mechanic in venting the various compression chambers, and said tool preferably comprises a bifurcated crank having oppositely projecting furcations, or tangs, suitable for engaging opposite sides of the rocker arm associated with one of the valves in the conventional engine valve operating mechanism. This tool permits the mechanic to hold one of these valves open and thereby interrupt the forcing of the compressed gases through the blown head gasket into the engine's cooling system.

DETAILED DESCRIPTION OF PREFERRED EMBODIMENT

Figure 1:
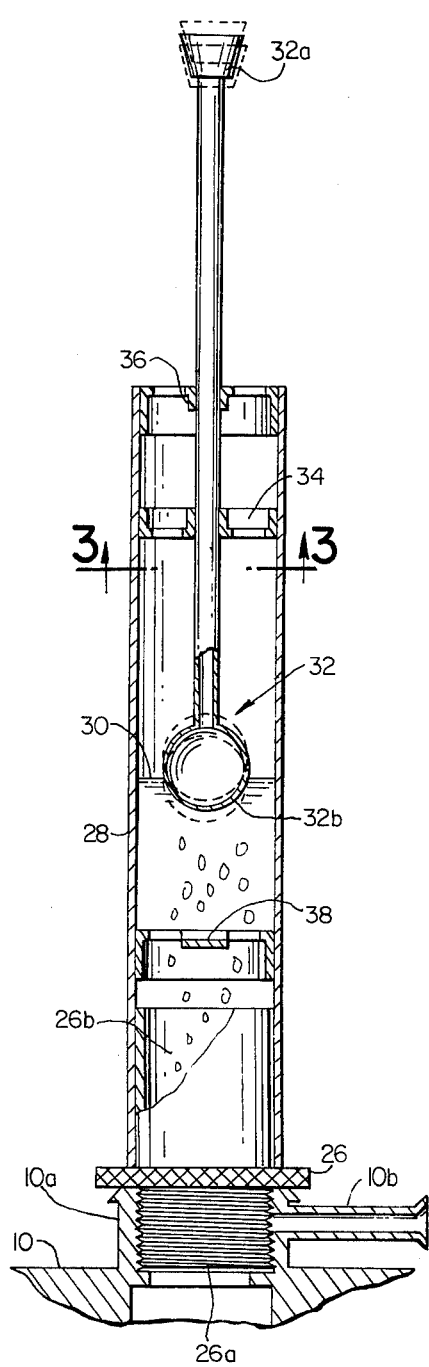
FIG. 1 shows in vertical cross section an indicator device constructed in accordance with the present invention, such device being installed in the radiator filler opening of a conventional internal combustion engine, the broken lines indicate the vibratory motion of the indicator portion of the device responsive to the escaping of compressed gases from the engine's cooling system.

Turning now to the drawing in greater detail, it is noted that only the essential portions of the mechanism necessary for practicing the method of the present invention, and illustrating the components necessary to make the parts required for practicing the present invention, are disclosed in detail in this drawing. Only selected portions of the conventional mechanism and associated equipment of the conventional internal combustion engine which must be utilized in practicing the present invention are shown in the drawing.

Considering first the conventional components of such an engine, FIG. 1 shows the upper portion of a radiator 10 having a conventional upwardly open radiator opening 10a, and associated vent opening 10b. The conventional filler cap (not shown) would normally be threadably received in the filler opening 10a but in practicing the present invention such a filler cap is removed and replaced by a device constructed in accordance with the present invention.

Figure 2:
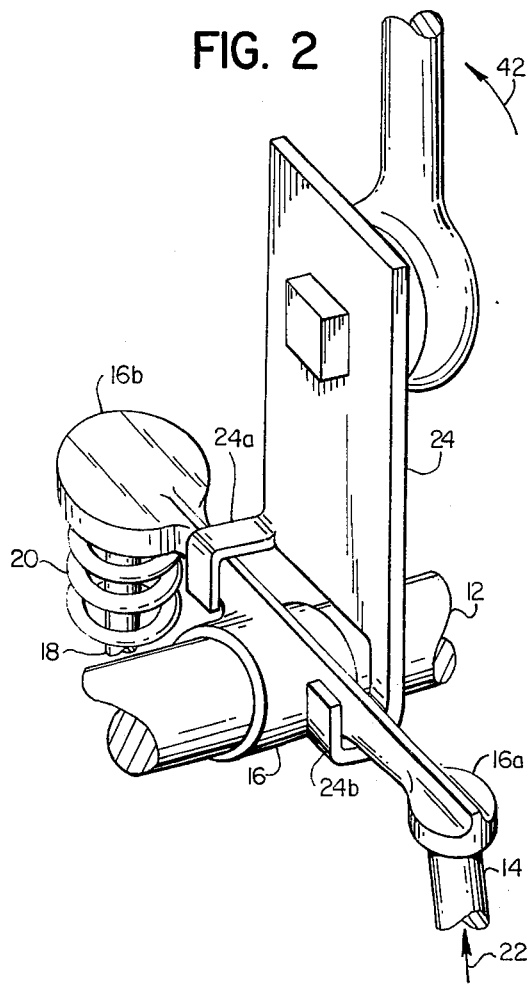
FIG. 2 is a perspective view, with portions broken away, of a conventional rocker arm assembly associated with either the intake or exhaust valve of a conventional internal combustion engine, and also shows the configuration of a manually operable tool suitable for interrupting the compression of the gases in one of the cylinders of a conventional multi-cylinder internal combustion engine of the type equipped with a radiator such as that shown in FIG. 1.

FIG. 2 shows a conventional rock shaft 12 of the type normally provided in present day internal combustion engines of the type having valve mechanisms adapted to be operated through push rods or the like such as indicated generally at 14. Still with reference to the conventional valve operating mechanism, a rocker arm 16 is journalled on the rock shaft 12 and has projecting arm portions 16a and 16b. The rocker arm 16 shown is representative of several provided on the shaft 12, two such arms being normally provided in side-by-side relationship for operation of the intake and exhaust valves associated with each of the cylinders in a conventional multi-cylinder engine. As shown, the nearer end portion 16a of the rocker arms 16 is operated by the push rod 14, and the far end 16b of the rock shaft 16 is adapted to operate a valve stem 18 associated with either the intake or exhaust valve in cooperation with the valve spring 20. The valve spring acts between the end portion 16b of the rocker arm 16 and fixed structure associated with the engine (not shown) such that the valve is normally maintained in a closed position and a lifting force in the direction of the arrow 22 on the rocker arm will cause counterclockwise rotation of the rocker arms 16 and hence opening movement of the valve against the biasing force of the spring 20. This motion is of course achieved in timed relationship to rotation of the engine crank shaft and is mentioned here only to clarify the function of the tool 24 to be described.

As shown in FIG. 1 an adapter 26 has one end 26a defining a threaded portion so as to be threadably received in the radiator filler opening 10a. The flanged portion of the adapter determines the limit position for rotation of the adapter in the filler opening 10a and also serves to seal off the vent opening 10b in order to allow the device to operate in the manner intended for it. Still with reference to the adapter 26 an upper portion 26b is sized to fit within the open lower end portion of a tubular housing 28 and it is a feature of the present invention that this adapter 26 can be replaced by other adapters having the same size upper portion 26b, but having lower portions of differring size to fit in the filler openings of various size radiators.

The tubular housing 28 comprises a reservoir defining structure, and is snugly received on the upper or opposite end 26b of the adapter 26 so as to receive a predetermined quantity of liquid as indicated generally by the level 30 in FIG. 1. This liquid is added to the liquid in the radiator in order to bring the level of such liquid up high enough to cause an indicator device 32 to float on the surface of the liquid 30. The indicator 32 will vibrate, generally between the positions suggested by the broken lines in FIG. 1, in response to the escaping of gas upwardly through the liquid 30 as a result of compression gases on one of the compression chambers of the engine escaping through a faulty head gasket into the engine's cooling system.

Figure 3:
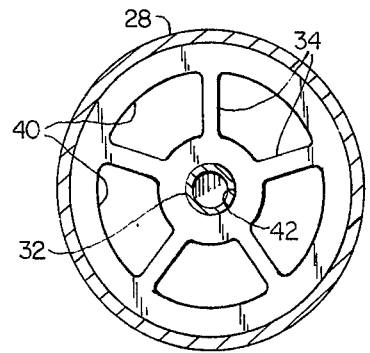
FIG. 3 is a sectional view taken generally on the line 3—3 of FIG. 1.

The tubular housing 28 is hollow, and collar members 34 and 36 are provided adjacent the upper end of the housing 28, being attached to the inside wall of such housing, and adapted to slidably support the indicator member 32 for limited axial floating movement in the tubular housing 28. The upper end portion of the elongated indicator member 32 projects upwardly beyond the upper end of the tubular housing 28 and may be provided with a top as indicated generally as 32a which top may be brightly colored so as to facilitate observance of such an indicator while the mechanic is operating on the valve operating mechanism with the tool 24 in a manner described hereinafter. A stop collar 38 is also provided inside the tubular housing 28 and is adapted to support the float end 32b of the elongated indicator member 32 when the liquid level 30 inside the tubular housing has not been filled to the extent shown in FIG. 1. All of these collar members 34, 36 and 38 are provided with passageways to allow the movement of liquid therethrough. The upper collar members 34 and 36 being so constructed to permit the addition of liquid to the tubular housing when the device is installed on the radiator, and the openings in the lower stop member 38 being provided to allow for the communication between the added liquid and the liquid already in the radiator. These passageways are shown with reference to the collar member 34 in FIG. 3, such openings or passageways being indicated generally at 40 in this view. The central opening 42 defined by the collar member 34 slidably supports the elongated intermediate cylindrical portion of the indicator member 32.

After the above described device has been installed on the radiator the engine to be checked can be operated with the result that compressed gases will escape into the cooling system from the compression chamber having the faulty head gasket. These gases enter the liquid of the cooling system and ultimately will escape upwardly through the indicator device to cause the vibratory motion of the float type indicator 32 described previously. In order to determine which cylinder has the faulty head gasket the compression in each of the cylinders in turn must be periodically interrupted or vented, and the tool 24 is intended for this purpose, such tool comprising a bifurcated crank having oppositely projecting furcations, 24a and 24b, adapted to abut opposite sides of the rocker arm 16 in order to permit rotation of the rocker arm 16 independently of the normal movement imparted thereto by the push rod 14. The tool 24 is quite compact, and has a square opening to conveniently receive the socket wrench handle as shown in FIG. 2.

Thus, the mechanic can hold the rocker arm 16 in the direction suggested by the arrow 42 in FIG. 2 with the result that the valve associated with the stem 18 will be held open throughout a complete cycle of the engine. By so doing, and by moving progressively from the first cylinder through all of the cylinders in the engine, the mechanic will then be able to determine which of these cylinders has the faulty head gasket simply by observing the indicator tip 32a and noting at which cylinder the indicator stops its vibratory motion.

I claim:

1. A head gasket leak detector for isolating that cylinder, in a multi-cylinder internal combustion engine of the liquid cooled type, having a blown head gasket, said detector comprising at least one adapter having one end adapted to fit snugly in the filler opening of a liquid filled radiator associated with the engine having a suspected head gasket leak, said adapter replacing the conventional radiator cap and sealing off the radiator vent opening, said adapter having an opposite end with a diameter of predetermined size, a hollow tubular housing snugly received on said opposite adapter end for receiving a predetermined quantity of liquid in communication with the liquid in said radiator, an elongated indicator member having a float at its lower end and having an upper indicator end above said housing, and means inside said tubular housing for slidably receiving said indicator member and permitting limited axial vertical floating movement thereof in response to gases escaping upwardly out of the radiator and through the liquid in said housing, and manually operable means for engaging the valve operating mechanism for each cylinder of the engine to permit venting each compression chamber in turn, thereby to provide a visual indication of which chamber is causing the escapement of compressed gases into the cooling system.

2. The leak detector defined in claim 1 wherein said manually operable means comprises a bifurcated crank having oppositely projecting furcations for engaging a rocker arm of one of said valve mechanisms to hold that particular valve open and vent its associated compression chamber.

3. The leak detector defined in claim 2 wherein a plurality of such adapters are provided, each such adapter having one end sized to fit a particular size radiator filler cap opening, all of said adapters having their opposite ends of said predetermined size, and said tubular housing being removably received on said opposite adapter ends.

4. The leak detector defined in claim 3 wherein said means inside said tubular housing for slidably receiving said indicator member more particularly comprises axially spaced collar members supported on the inside wall of the tubular housing and defining central openings for slidably receiving an intermediate portion of said indicator member, and a stop member spaced below said collar members and also supported on the inside wall of the tubular housing to support the lower float defining end of said indicator member until the liquid is added to the housing to float said member, said collar members and stop member having additional openings to allow the passage of liquid through them.

5. The leak detector defined in claim 1 wherein a plurality of such adapters are provided, each such adapter having one end sized to fit a particular size radiator filler cap opening, all of said adapters having their opposite ends of said predetermined size, and said tubular housing being removably received on said opposite adapter ends.

6. The leak detector defined in claim 1 wherein said means inside said tubular housing for slidably receiving said indicator member more particularly comprises axially spaced collar members supported on the inside wall of the tubular housing and defining central openings for slidably receiving an intermediate portion of said indicator member, and a stop member spaced below said collar members and also supported on the inside wall of the tubular housing to support the lower float defining end of said indicator member until the liquid is added to the housing to float said member, said collar members and stop member having additional openings to allow the passage of liquid through them.

7. A method for isolating that cylinder, in a multi-cylinder internal combustion engine of the liquid cooled type, having a blown head gasket, said method comprising:
   a. removing the filler cap on the radiator filler opening,
   b. removing the engine valve covering,
   c. inserting an adaptor in said filler opening, said adapter having a reservoir defining structure associated therewith and an indicator device movably mounted therein,
   d. filling said reservoir with liquid to a level such that the indicator floats freely therein,
   e. operating the engine to compress gases in the various cylinders, thereby forcing gas to escape through the blown head gasket into the engine cooling system and cause movement of the indicator.

8. A head gasket leak detector for an engine cooling system, comprising at least one adapter having one end adapted to fit snugly in the filler opening of a liquid filled radiator associated with the engine having a suspected leak, said adapter replacing the conventional radiator cap and sealing off the radiator vent opening, said adapter having an opposite end with a diameter of predetermined size, a hollow tubular housing snugly received on said opposite adapter end for receiving a predetermined quantity of liquid in communication with the liquid in said radiator, an elongated indicator member having a float at its lower end and having an upper indicator end above said housing, and means inside said tubular housing for slidably receiving said indicator member and permitting limited axial vertical floating movement thereof in response to gases escaping upwardly out of the radiator and through the liquid in said housing.

9. The leak detector as defined in claim 8 wherein a plurality of such adapters are provided, each such adapter having one end sized to fit a particular size radiator filler cap opening, all of said adapters having their opposite ends of said predetermined size, and said tubular housing being removably received on said opposite adapter ends.

10. The leak detector defined in claim 9 wherein said means inside said tubular housing for slidably receiving said indicator member more particularly comprises axially spaced collar members supported on the inside wall of the tubular housing and defining central openings for slidably receiving an intermediate portion of said indicator member, and a stop member spaced below said collar members and also supported on the inside wall of the tubular housing to support the lower float defining end of said indicator member until the liquid is added to the housing to float said member, said collar members and stop member having additional openings to allow the passage of liquid through them.

11. The leak detector defined in claim 8 wherein said means inside said tubular housing for slidably receiving said indicator member more particularly comprising axially spaced collar members supported on the inside wall of the tubular housing and defining central openings for slidably receiving an intermediate portion of said indicator member, and a stop member spaced below said collar members and also supported on the inside wall of the tubular housing to support the lower float defining end of said indicator member until the liquid is added to the housing to float said member, said collar members and stop member having additional openings to allow the passage of liquid through them.

* * * * *

UNITED STATES PATENT OFFICE
CERTIFICATE OF CORRECTION

Patent No. 4,059,985   Dated November 29, 1977

Inventor(s) Buford L. Kelly

It is certified that error appears in the above-identified patent and that said Letters Patent are hereby corrected as shown below:

Col. 3, line 32, "as" should be --at--.

Col. 3, line 57, after "operated" insert --or turned over--.

Col. 5, after line 38 insert:

--f) interrupting the compression at each cylinder in turn while the engine is in operation to determine which cylinder head gasket is leaking by g) watching the indicator to see when it stops moving as a result of interrupting the compression.--

Signed and Sealed this

Second Day of May 1978

[SEAL]

Attest:

RUTH C. MASON
Attesting Officer

LUTRELLE F. PARKER
Acting Commissioner of Patents and Trademarks